(12) United States Patent
Alexander et al.

(10) Patent No.: US 7,325,749 B1
(45) Date of Patent: Feb. 5, 2008

(54) DISTRIBUTED SOLID STATE PROGRAMMABLE THERMOSTAT/POWER CONTROLLER

(75) Inventors: Jane C. Alexander, Rogersville, AL (US); David E. Howard, Hazel Green, AL (US); Dennis A. Smith, Athens, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 774 days.

(21) Appl. No.: 10/738,352

(22) Filed: Dec. 17, 2003

(51) Int. Cl.
*F16K 37/00* (2006.01)
*G05F 3/00* (2006.01)
(52) U.S. Cl. .................. 236/78 A; 236/49.3; 323/299; 323/318
(58) Field of Classification Search ............... 236/49.3, 236/78 R, 78 A, 78 B; 323/299, 318; 62/186
See application file for complete search history.

(56) References Cited

U.S. PATENT DOCUMENTS

| | | | |
|---|---|---|---|
| 4,382,544 A | 5/1983 | Stewart | |
| 4,657,179 A | 4/1987 | Aggers et al. | |
| 5,566,879 A | 10/1996 | Longtin | |
| 5,682,949 A | 11/1997 | Ratcliffe et al. | |
| 5,803,357 A | 9/1998 | Lakin | |
| 5,833,134 A | 11/1998 | Ho et al. | |
| 6,089,310 A | 7/2000 | Toth et al. | |
| 6,213,404 B1 | 4/2001 | Dushane et al. | |
| 6,260,765 B1 | 7/2001 | Natale et al. | |
| 6,264,111 B1 | 7/2001 | Nicolson et al. | |
| 6,326,598 B1 * | 12/2001 | Carvalho et al. | 219/505 |
| 6,351,693 B1 | 2/2002 | Monie et al. | |
| 6,449,533 B1 | 9/2002 | Mueller et al. | |
| 6,529,796 B1 * | 3/2003 | Kroeger et al. | 700/202 |
| 2006/0062030 A1 * | 3/2006 | Keller | 363/78 |

* cited by examiner

*Primary Examiner*—Marc Norman
(74) *Attorney, Agent, or Firm*—James J. McGroary; Ellis B. Ramirez

(57) ABSTRACT

A self-contained power controller having a power driver switch, programmable controller, communication port, and environmental parameter measuring device coupled to a controllable device. The self-contained power controller needs only a single voltage source to power discrete devices, analog devices, and the controlled device. The programmable controller has a run mode which, when selected, upon the occurrence of a trigger event changes the state of a power driver switch and wherein the power driver switch is maintained by the programmable controller at the same state until the occurrence of a second event.

22 Claims, 6 Drawing Sheets

| ID | IDENTIFIER | STATUS |
|---|---|---|
| CONT1 | 00010 | S |
| CONTN | 00001 | S |
| MAST1 | 10000 | M |
| MASTN | 11000 | M |
| MASTS | 00110 | SM |

DISTRIBUTED SOLID STATE PROGRAMMABLE THERMOSTAT/POWER CONTROLLER

ORIGIN OF THE INVENTION

The invention described herein was made by employees of the United States Government and may be manufactured and used by or for the government for government purposes without payment of any royalties thereon or therefore.

FIELD OF THE INVENTION

This invention relates generally to controllers and more specifically to power controllers and methods for controlling the response of a power switch based on a certain stimulus.

BACKGROUND OF THE INVENTION

In controlling the activation of a machine it is common to employ a digital computer, special purpose computational circuits, or microprocessor. The digital computer is typically a microprocessor which is dedicated by firmware to cause the activation of a variety of functions. Such components, microprocessors, and special purpose computational circuits will be referred to herein generally as "controllers".

One form of programmable control activation includes a centralized control unit that monitors environmental sensors and inputs from user controls to maintain a schedule of pre-programmed time-of-day and day-of-the week events. Inputs to the central control are provided by dedicated low-voltage wiring, signals carried on power lines, RF signals, signals on existing telephone wiring and, occasionally, optical signals. The central control unit is controlled by a program that is either specifically built for the particular installation or a general-purpose program with a user interface that allows operator to make certain types of modifications.

Where the controller contains a first processor for controlling a machine or device and a second processor controls the first processor, the first processor will be referred to as a "slave" processor and the second processor will be referred to as a "master" processor. In a master-slave system, there is ordinarily a random access memory ("RAM") associated with each processor and at least one mass storage device, such as a magnetic disk, associated with the system. The system also typically includes an input device, such as a keyboard associated with the master processor, and a visual output device such as a cathode ray tube ("CRT") display or a printer. In programmable controlled activation it is often desirable to change the programmed controller software in order to perform different functions, such as data evaluation or output functions. The software typically comprises several functionally distinct parts, such as parts for performing human interface, circuit control, file storage, and computational functions. Sometimes these parts are divided between different programs or distributed between the controllers. In particular, in a master-slave system, the computational function is ordinarily performed by a program in the slave processor, while a program in the master processor ordinarily performs the human interface function.

In one example of a computational function, controllers have been employed in heating, ventilating and air conditioning systems to monitor and regulate the positions of damper and valve actuators for controlling airflow and fluid flow in air handling units and to monitor the signal values of temperature and humidity sensors and regulate their related set points. Generally, such systems employ a centralized processing unit acting as a master having operator display and manual control functions as well as computational and command-generating capabilities. Additionally, the centralized processing unit embodies a library of computer software programs arranged in a relatively complex programmer language for providing energy management functions like temperature set back in office buildings during non-peaked hours and for limiting total load demand during peaked hours. These centralized processing units are commonly termed head end units and are operably coupled at the first or highest hierarchical level in a building environment system. The farther down you move in this hierarchical structure the less flexible the units are to program because of their limited capabilities. The head end units often control and monitor hundreds of individual datum points within an environmental system. For example, the position of actuators used for damper and valve positioning and the output signals of temperature and humidity sensors used for providing feedback data relating to those parameters are examples of such datum points.

In addition to the central processing unit automated networks are often employed with a plurality of second level data processing units operably coupled to the head end unit for performing certain tasks which would otherwise be required to be performed by the latter. As an example, a data processing unit may perform information-checking functions with respect to signals passing between data points and the head end unit. Such data checking may include, for example, the detection of alarm signals or the detection of temperature changes that exceed predetermined values. Each data processing unit may, in turn, have a plurality of third level field processing units operatively coupled to it for performing analog to digital conversion and limited processing functions. This pushing down of functions to downstream data processing units, however, increases the likelihood of errors and makes recovery dependent upon the functionality of other data processing units.

The above system customarily employ actuators for the manipulation of valves used to control the flow of fluid and heater coils. Because digital signals from a field processing unit are often incapable of directly powering these actuators, it may be necessary to provide a separate, power amplifying and signal transducer equipment interface panel immediately adjacent each of the units. These interface panels receive digital signals from the associated field processing unit and responsively provide pneumatic or electrical power at levels sufficiently high to position the actuators mechanically coupled to the dampers or valves.

While the aforementioned arrangements for controlling a device or unit are in wide use, they tend to be characterized by certain disadvantages. In particular, the head end central processing unit may be subject to periodic failures. In the event of a failure of the centralized processing unit, the entire system or major portions thereof may be disabled. The field processing units are frequently incapable of algorithmically processing received information and generating commands or other signals based thereon. Field processing units have limited utility in that they contain no computer programs, either in single or selectable library configuration, for continuously performing optimized control functions in a stand alone mode or for permitting a local operator to select and modify an aspect of a program routine to meet the requirements of locally-changed environmental conditions or for that matter conditions that require close monitoring and a real time response. Another disadvantage of field processing units of the known type is that their control capability is frequently degraded when functioning in a standalone mode by reason of the failure of equipment related to the head end unit. In particular, they are configured to retain actuator positions at settings that existed immediately preceding a fault rather than to continue to monitor and control positions for optimized energy management and occupant comfort. An additional limitation of the prior art systems is that there are often an equal number of power sources for each of the power signal conditioners, controllers, analog to digital converters, and the controlled unit. A failure in one power source can lead to a breakdown of the overall system.

For the reasons set forth above there is a need for a self-contained controller that can monitor environmental parameters, generate electrical power upon the occurrence of a triggering event, and operates on a single power source.

SUMMARY OF THE INVENTION

In light of the above, therefore, it is an object of the invention to provide a self-contained power controller that can provide electrical power to the device being controlled, requires only one voltage source, and can independently perform the necessary processing of information to trigger the activation of the powering source for the device being controlled.

In one aspect, there is provided a system of programming at least one self-contained power controller. The system includes a programmable controller operatively coupled to at least a first control device where the programmable controller detects the environmental condition of the control device. The programmable controller has a run mode which, when selected, allows the programmable controller to be programmed to change the state of a power driver switch upon the occurrence of the trigger event. The trigger event condition is communicated to the programmed controller using a communication link, or is keyed into the programmed controller by a user.

According to another aspect, there is provided a method of programming at least one self-contained controller. The method includes providing a programmable controller operatively coupled to a power driver switch, placing the programmable controller in a run mode and changing the state of a power driver switch. The at least one self-contained controller is programmed to go to its programmed state upon the occurrence of a trigger event. The trigger event condition is communicated to the programmed controller using a communication link, or is keyed into the programmed controller by a user.

DETAILED DESCRIPTION OF EXEMPLARY EMBODIMENTS

Figure 1:
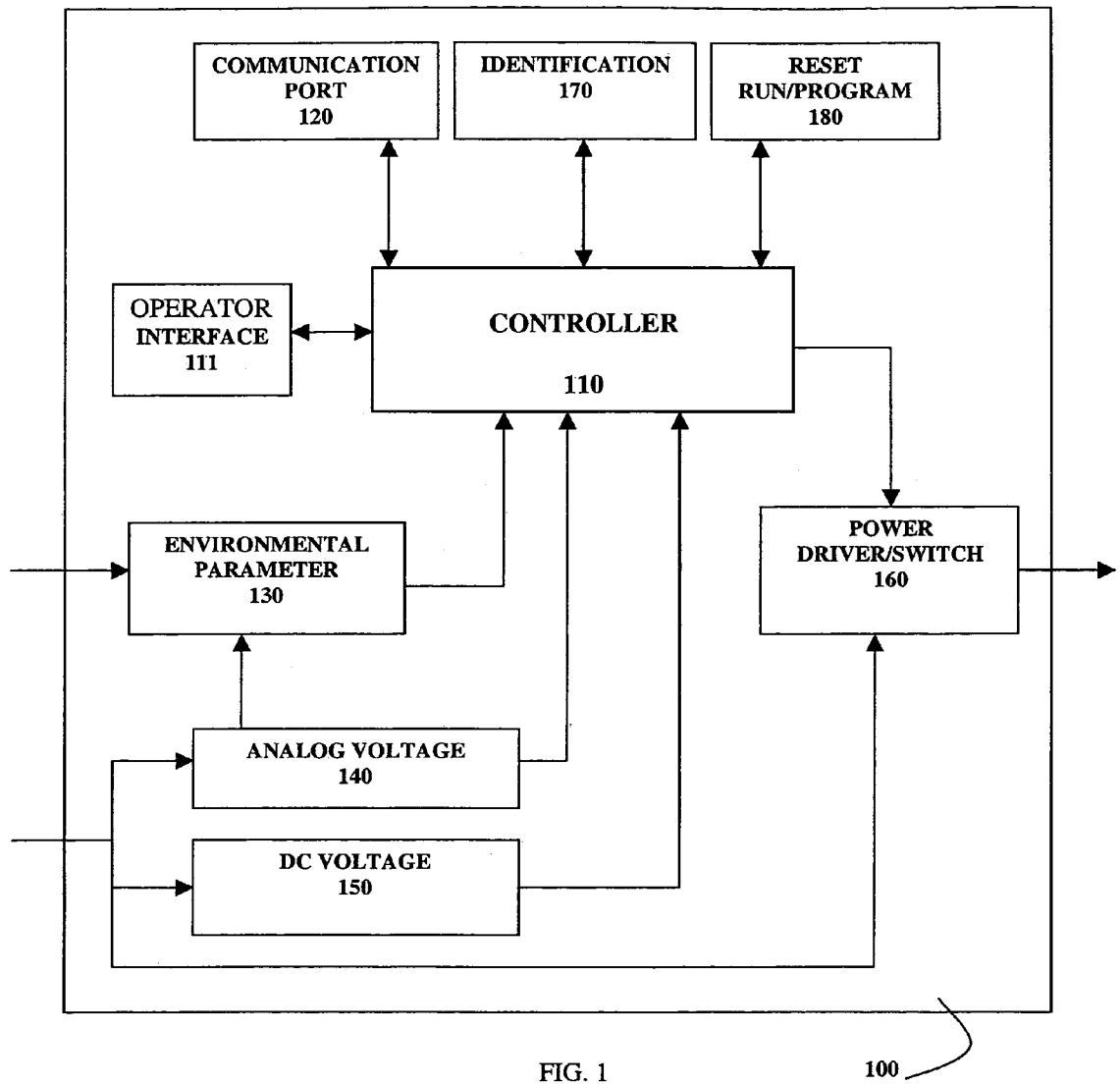
FIG. 1 is an overview of the self-contained power controller system.

FIG. 1 is an overview of an exemplary self-contained power controller. The power controller includes a communication port 120, an identification unit 170, a reset run/program unit 180, an operator interface 111, an environmental parameter 130, an analog voltage 140, dc voltage 150, and a power driver/switch 160.

The communication port 120 may include a point-to-point communication device. In some embodiments, the point-to-point communication device implements RS-232, RS-422, or RS-485 transfer protocols or any known or later developed communication device for exchanging data. The communication port 120 allows the user to daisy chain several of the self-contained power controllers so the controller can be programmed, receive data, or configure from a single remote location. In some embodiments, a multipoint communication configuration is implemented because more devices may be operably coupled to a signal cable. In the multipoint embodiment, each slave unit has a unique address and responds only to packets addressed to the slave unit. In some other embodiments the daisy chain is accomplished by the use of a RS-485 device using either a 1 TwistedPair or 2 TwistedPair cable configuration. In a 1 TwistedPair configuration, all devices are operably coupled to a single signal cable so communication occurs in both directions. In a 2 TwistedPair configuration the slave devices transmit over the second TwistedPair.

The identification unit 170 may include a dual inline parallel (DIP) switch, a wire per address, an address in temporary memory or permanent memory, or any known or later developed identification device for maintaining an indicia or label for distinguishing one self-contained power controller from another. The source of the signal can be the communication port 120, or a signal from a cable harness. The identification is set for a single device and used to select which one of the multiple devices a remote programmer desires to talk to.

In some embodiments, the reset run/program unit 180 includes a two state switch, a signal from an operator interface 111 and/or the communication port 120, a decision point embodied in software, or any other device or component that can discriminate between two states. The run mode of the reset run/program unit 180 allows for reprogramming or setting triggering events that can be used to activate a power driver/switch 160. The triggering events are based on the application of the self-contained power controller 100 in monitoring environmental parameters. In one example in which a heater is controlled, the triggering event is the operating temperature of the heater and the operating temperature is measured and an "ON" temperature condition and "OFF" temperature condition are selected for control. In medical application, for example, the triggering point is pressure, temperature, gas content, and/or any other information that can be gathered and processed to develop a criteria which determines the state to which the power/driver switch 160 is set. The program mode of reset run/program unit 180 allows for the programming of the firmware, operating systems, or other software that allows the programmed controller 110 to perform the task of monitoring a triggering event and activation or deactivation of the power driver/switch 160.

The operator interface 111 and the reset run/program unit 180 can be embodied as computer hardware circuitry or as a computer-readable program, or a combination of both. In the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

In various embodiments, the environmental parameter unit 130 includes signal conditioners, calibration, and/or compensation circuitry for receiving a signal from a controlled device. The signal can be a raw signal or a processed signal from an external device that may be in proximity to the controlled device. In some embodiments the environmental parameter unit 130 forms part of the self-contained controller and its primary function is to modify the raw signal to make it actionable by the programmed controller 110.

The analog voltage device 140 includes circuitry that receives a voltage at a first level (V1) and produces a second voltage (V2) that is a regulated DC voltage in form. In some embodiments the first voltage (V1) is +28 VDC and the second voltage is +5 V_analog. The second voltage is required to power the analog circuitry such as analog to digital converter, signal conditioners, etcetera. The DC voltage device 150 includes circuitry that receives a first voltage and produces a third voltage (V3) that runs all the discrete or digital circuits. In some embodiments the first voltage is +28 VDC and the third voltage is +5 VDC. The first voltage is also used to drive the controlled device through the power driver/switch 160 upon activation by the programmed controller 110. The arrangement of the elements in FIG. 1 can solve the shortcomings of the conventional controller of having multiple power sources and external monitor for a controlled device. All the elements needed to control and assess the status of a device under supervision are contained within the self-contained power controller 100.

The programmable controller 110 is particularly useful for programming when activation of the power driver/switch 160 should occur. The activation occurs at set triggering events and with corresponding "on" and "off" states When the trigger event is put in its "on" state, the selected self-contained power controllers 100 goes to the "on" state and electric energy flows through the power driver/switch unit 160. When the trigger event is put in its "off" state, the selected programmable controller 111 in its respective self-contained power controller 100 goes to the "off" state. The data for the triggering event for the programmable controller 110 is from the environmental parameter device (temperature, pressure, . . . ) or other user defined parameter(s) either measured or derived from other parameters. After the environmental parameter has been read or compiled the programmable controller 110 switches the state of the power driver/switch 160 and the controlled device (heater, valve, . . . ) in order to maintain the environmental parameter between the pre-programmed upper and lower limit. One embodiment of circuitry for the programmable controller is found in FIG. 4.

Figure 2:
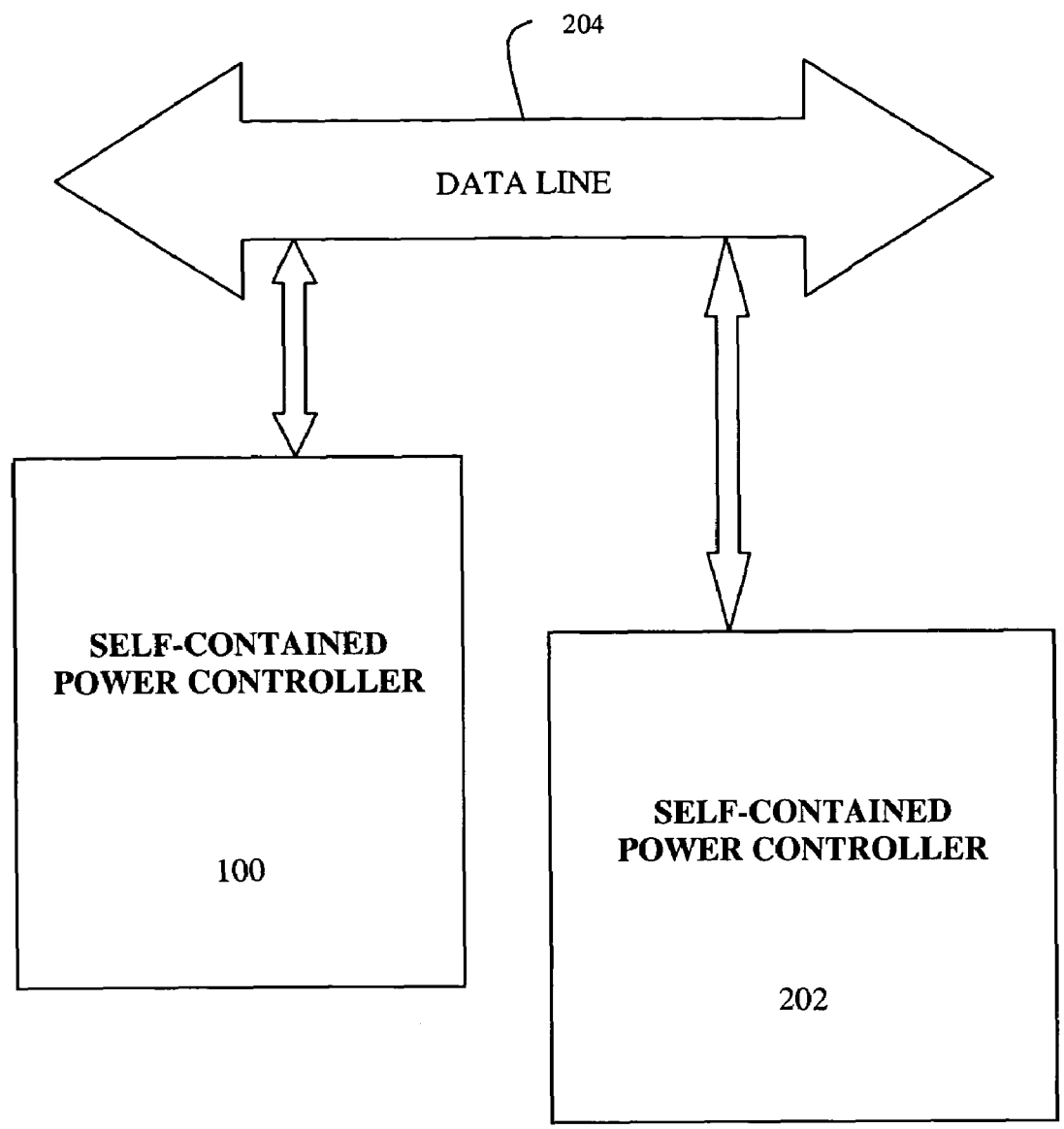
FIG. 2 is a master slave system with two self-contained power controller system.

With reference to FIG. 2, system 200 includes a self-contained power controller 100 that is operably coupled to one or more self-contained power controllers 202 through data line 204. The arrangement of figure two shows a master/slave configuration.

Figure 3:
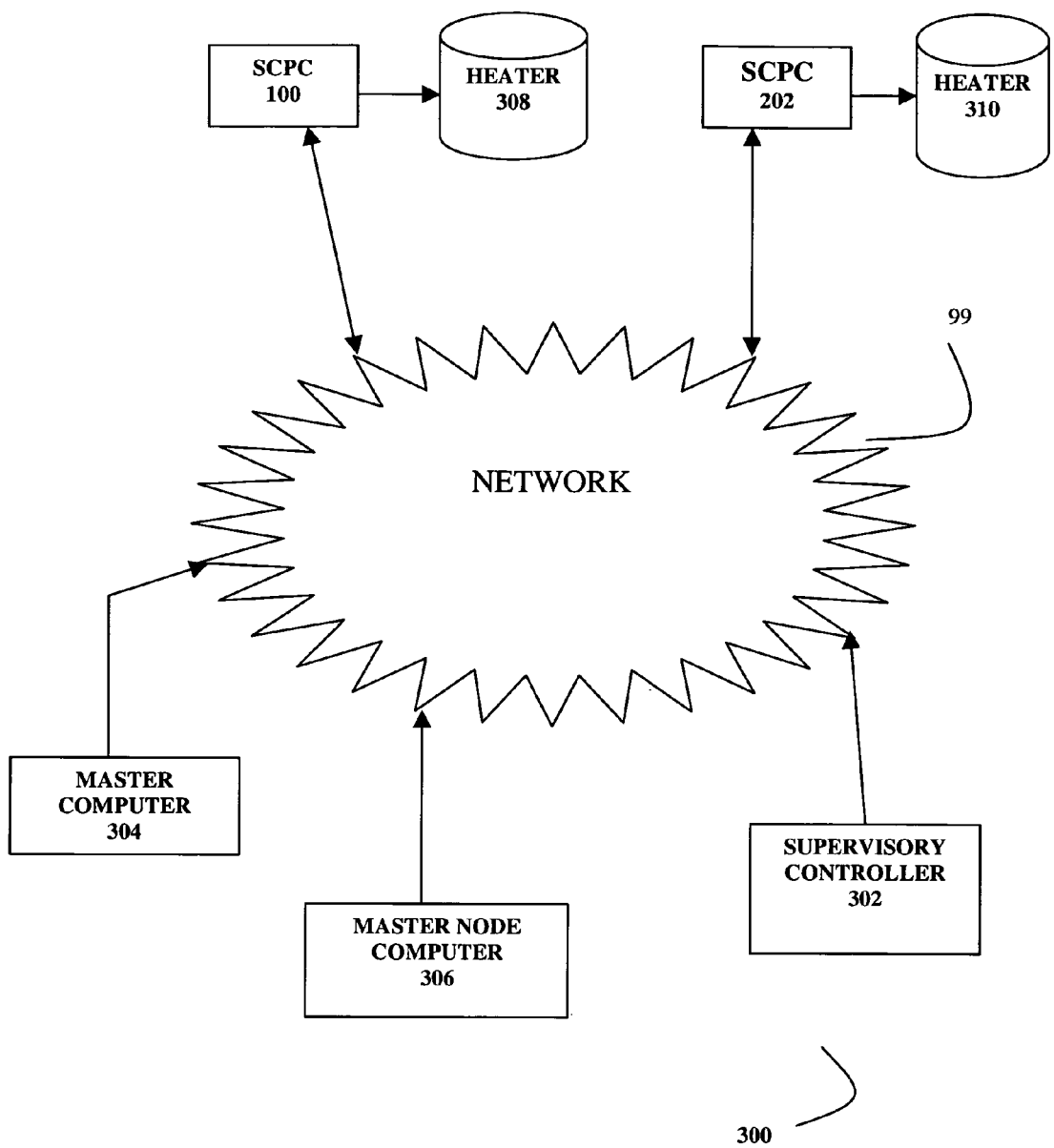
FIG. 3 is a network system with multiple self-contained power controllers.

With reference to FIG. 3, system 300 includes a self-contained power controller 100 that is operably coupled in a master-slave configuration comprising a supervisory controller 302. System 300 also includes one or more master nodes 304 and 306 serially connected to one another and to a serial port of the supervisory controller 302, a plurality of slave devices 100 and 202, hereinafter called power controllers, serially connected to one another and to master nodes for bi-directional communication therewith. The local and master nodes are identical in construction and programming. Though FIG. 3 shows Heaters 308 and 310, those in the art should understand that the controlled device need not be limited to a heater. The only difference between the master slave arrangement in FIG. 2 and FIG. 3 resides in the manner in which the nodes are initialized upon installation. In FIG. 2 there is only one master while the present arrangement has a master per node. The power controllers 100 and 202 are responsible for controlling their respective power driver switch and operate within the constraints of parameters downloaded to them from time to time. Both their operating program and the parameters may be updated singularly or in combination. Furthermore, each of the power controllers 100 and 202 communicate the current status of their respective power driver/switch to the main computer system via the local nodes and master nodes. Each of the local nodes is responsible for a plurality of self-contained power controllers 100 and 202 in a particular area. Similarly, each master node 304 and 306 is responsible for a plurality of local nodes and communicates directly with the supervisory controller system 302. It includes a master node table for storing updated status information of all parameters for each local node and its respective slaves. The arrangement of FIG. 3 is an example of a network environment with master nodes and local nodes. The network 99 is a local area network, a local area network coupled to the Internet, a local area network coupled to a dedicated communication or bridge circuit that would facility communication with other networks or devices such as the World Wide Web. The network 99 can be any arrangement that facilitates the exchange of information for the purpose of controlling a tethered appliance to the self-contained power distribution controller. In the preferred direct coupling embodiment, all programmed controllers would be enabled with communication in both directions so that the supervisory controller can poll the self-contained controllers to determine what their current parameter settings are. Thereafter supervisory controller 302 would send a parameter set point based signal with a unique identifying signal, which would cause a selected one of self-contained power controller to have its set point parameter changed.

Figure 4:
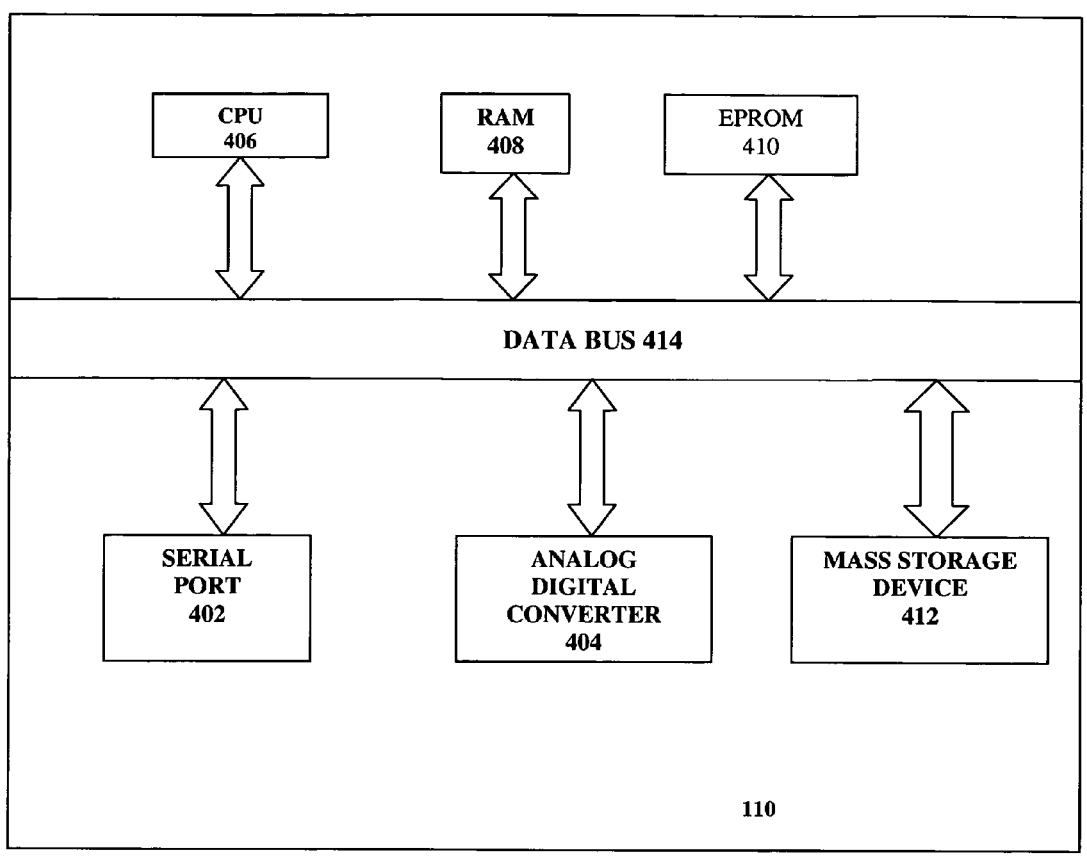
FIG. 4 is an overview of the programmed controller in the self-contained power controller.

FIG. 4 illustrates one embodiment of a programmable controller 110 in FIG. 1 The supervisory controller or the self-contained controller comprise a programmable controller device 110, an operator interface 111 that may include a display monitor, a keyboard, and printer. The programmable controller device 110 includes a serial port 402, an analog to digital converter 404, and a central processor unit 406 or microprocessor preferably having both RAM memory 408 and EPROM memory 410. The central processor unit 406 is operatively coupled to the serial port 402, and analog to digital converter 404. The serial port 402 is operatively coupled to the communication port 120 to receive and broadcast messages over the communication line. The programmable controller 110 has an address identified with it which may be stored in RAM 408, EPROM 410 or alternatively, an address selector, operatively coupled to the central processing unit 406, can be provided to allow the address of the programmable controller 110 to be selected. The programmable controller device 110 also includes a mass storage device 412 for storing data and program files in a well-known manner. The storage device 412 includes a data file in the form of a system configuration table shown in FIG. 7 for storing updated status information of all parameters for each local node and its respective slaves. The components of programmable controller 110 are operatively coupled through a data bus 414.

Figure 5:
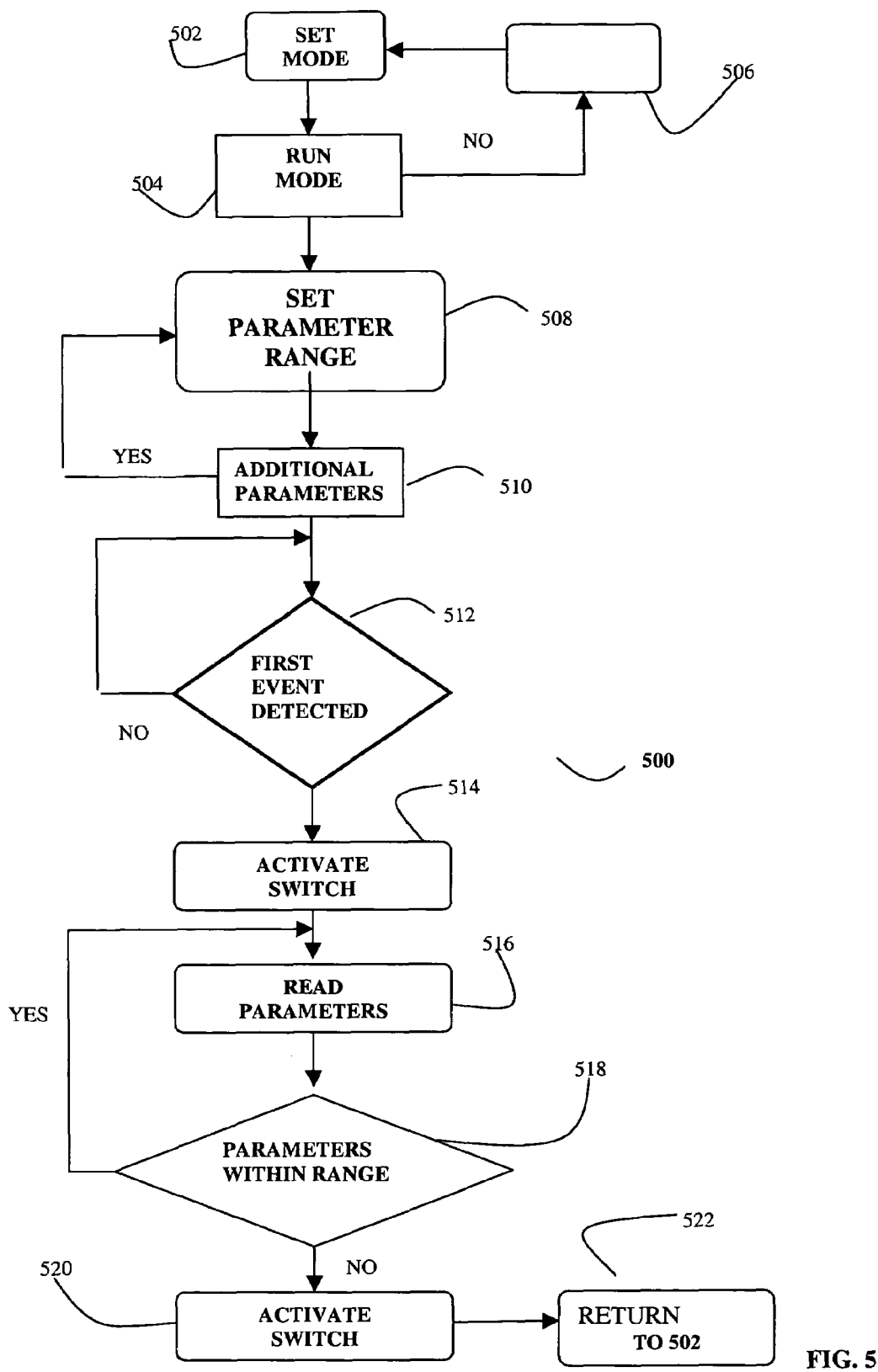
FIG. 5 is an overview of a method for the steps performed by the self-contained power controller.

FIG. 5 is an exemplary view of a method 500 of one embodiment. In operation, let us assume the user wants to regulate temperature in a room, space, or heater. The user would set the temperature at the supervisory controller 302 to the desired set point temperature for room, space, or heater. In various embodiments, the desired supervisory controller 302 is a device that is capable of communicating with the self-contained power controller 110. For example, a personal digital assistance (PDA), a telephone device, a general-purpose computer, or an operator interface device at the self-contained controller. The supervisory controller 302 transmits the desired set point temperature to the assigned self-contained power controller 100 as a first event (temperature to active heater) and second event (temperature to deactivate heater). The assigned self-contained power controller 100 receives signals indicative of the sensed temperatures of adjacent heater 200 and generates first and second control signals to the power driver/switch 160 at the moment of activation or deactivation.

FIG. 5 diagrammatically illustrates a method 500 for control. In action 502 the set mode is determined. The mode may be select by a user through the operator interface or by signal received from the supervisory controller. The default setting is the run mode.

In action 504, a run mode is determined. The determination is based on the information provided in 502. This information can be a single bit or it can be the result of a precondition such as the indication of an interrupt. If the indication is that the run mode is not desired then the process advances to action 506. In action 506, the supervisory controller 302 can download firmware to run specific routines, perform software maintenance, or perform software updates. The self-contained power controller 100 can perform the passing of data, status, or other information to the supervisory controller 100. In a 1 TwistedPair configuration such a transfer is predetermined during initialization. In a 2 TwistedPair configuration the transfer can happen simultaneously because two lines are being used. In the event that action 504 determines that a run mode is being selected the process proceeds to 508.

In action 508, a set parameter is determined. The set parameter is a range of values for environmental parameters that are to be controlled by the self-contained power controller. Examples of environmental parameters include temperature, pressure, moisture content, gas content, or other controllable parameters. The range at a minimum consists of an upper and lower value. An example is a range is 60° F. and 80° F. Once a parameter is entered then control progresses to action 510.

In action 510, a determination is made as to whether or not an additional parameter is being set. If the decision is yes then control returns to action 508. If the decision is no then control passes to action 512.

In action 512, detection of a monitor event is determined. The determination of the event is a condition that is derived from the parameters set in action 508. In a simple case it could the occurrence of a low temperature condition so a heater has to be turned on. A more complicated case could be a combination or a function of the parameters set in action 508. If the determination is negative then control returns to the beginning of action 512. If the event is detected then control is passed to action 514.

In action 514, the switch is activated. The activation of the switch is a signal to change the state of the switch. If the switch was in the "off" position then switch would be moved to the "on" position. However, if the switch was in the "on" position then it would be switched to the "off" position. The activation of the power driver/switch 160 at figure 160 causes the first voltage to flow to the device being controlled. In the case of deactivation the first voltage is prevented from powering the controlled device. After the switch is activated control passes to action 516.

In action 516, the parameters are read. The parameters are read in real time from within the region of the device being controlled. Further, the parameters could be read from storage such as RAM, ROM, EPROM, or any other known or later developed storage device. After reading the parameters control then passes to action 518.

In action 518, parameter within range is determined. A determination is made by comparing if the parameter is within the lower and upper value for the parameters to be monitored. For example, in the temperature scenario if the value is within 60° F. and 80° F. then a determination of yes is made and control would pass to action 516. In other words the programmed controller 110 of FIG. 1 maintains the status quo until the detection of the second triggering event. The process would continue in action 518 until the triggering event of the upper temperature is reached. When the triggering event is reached or when the temperature is no longer within the range control is passed to action 520.

In action 520, the switch is activated. The activation of the switch is a signal to change the state of the switch. In the heater activation scenario the power to the heater is turned off since as described above it was in an on state. After the state of the switches changed control passes to 522. In action 522 control is return to the beginning of the process. While the process has been described as sequential those in the art understand that the method could be broken into independent components or processes and still not deviate from the purpose of the invention.

Figures 6, 7:
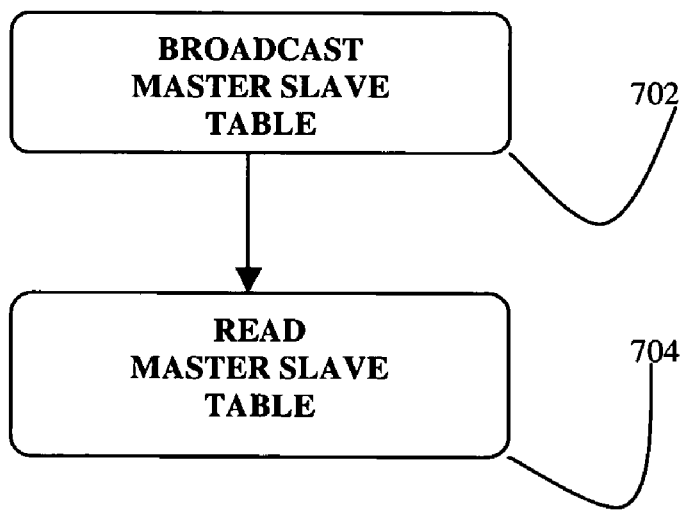
FIG. 6 is an identification data structure used by the self-contained power controller.
FIG. 7 is a flowchart showing an exemplary method used by the self-contained power controller for broadcasting the identification data structure.

FIG. 6 shows an identification table structure 600. Table 600 includes an ID column 602 that stores text identification information of the functional name of the controller. Table 600 also includes and identifier column 602 that stores coded identification information in numerical format. The numerical format should be the least number of bits that uniquely identifies the controller of column 602. For example, for 32 devices the numerical format can be five bits. Table 600 also includes a status column 606 that stores status of each controller as a slave, master, or slave-master. Each row in table 600 represents a vector that uniquely identifies the controller and its status. FIG. 7 is an embodiment of a method 700 for distributing the master slave table shown in FIG. 6.

In action 702, the master slave table is broadcast to each self-contained power controller. In action 702, each self-contained power controller 100 reads the master slave table. The table can be as simple as a traditional one master and N slave arrangement, or it can be self-contained controllers with dual roles as master for a selected group of controllers and slave to another group controllers as explained in FIG. 3 of this disclosure. Whatever the arrangement the self-contained power controller 100 operates on a single voltage (V1), monitors the controlled device, and activates the controlled device by use of the single voltage (V1).

What is claimed is:

1. A self-contained power controller comprising:
a power driver switch;
a programmable controller coupled to and communicating with the power driver switch, wherein the programmable controller has a run mode which, when selected, upon the occurrence of a trigger event allows the power driver switch to change its state and wherein the power driver switch is maintained at that state until the occurrence of a second event;
an environmental parameter device coupled to the programmable controller, the environmental parameter device providing at least one parameter value to the programmable controller to generate a first and second event; and
an analog voltage device and a direct current voltage device both coupled to a first voltage source at a first voltage value, wherein the analog voltage device produces a second voltage value and the direct current voltage device produces a third voltage value.

2. The self-contained power controller according to claim 1, wherein the environmental parameter device is coupled to a controlled device.

3. The self-contained power controller according to claim 1, further comprising:
a communication port including a transceiver for two way communication between the programmed power controller and at least one of a plurality of controllers.

4. The self-contained power controller according to claim 1, further comprising:
wherein the power driver switch is coupled to the first voltage source and has an on state and an off state.

5. The self-contained power controller according to claim 4, further comprising:
a communication port including a transceiver for two way communication between the self-contained power controller and at least one of a plurality of controllers.

6. The self-contained power controller according to claim 5, further comprising:
wherein the plurality of controllers is selected from the group consisting of a self-contained power controller, a supervisory controller, a personal computer, a personal digital assistant, and a keypad.

7. The self-contained power controller according to claim 6, further comprising:
wherein the controller broadcasts identification information that configures the programmed controller to be at least a master or slave with respect to the at least one controller.

8. The self-contained power controller according to claim 7, further comprising:
wherein the controller broadcasts values indicative of the first and second condition which the programmed controller use a value to trigger the change in state of the power driver switch.

9. The self-contained power controller according to claim 5, wherein the controller broadcasts values indicative of the first and second condition to trigger the change in state of the power driver switch.

10. A method for operating a self-contained power controller having an associated power driver switch, a communication port, an environmental parameter device, and programmed controller comprising:

placing the programmed controller in run mode;
providing environmental parameter information from a control device;
providing a first voltage to the associated power driver switch, wherein the first voltage is from a first voltage source;
providing an analog voltage device and a direct current voltage device both operatively coupled to the first voltage source, wherein the analog voltage device produces a second voltage and the direct current voltage device produces a third voltage;
providing the second and third voltage to the programmed controller;
providing the second voltage to the environmental parameter device;
evaluating the environmental parameter information to determine the occurrence of a triggering event; and
charging the associated power driver switch state upon the occurrence of a triggering event.

11. A method according to claim 10, wherein the communication port is coupled to the programmed controller and at least one of a supervisory controller, a computer, a personal digital assistant, and a keypad.

12. A method according to claim 11, wherein the information received by the programmed controller through the communication port is at least one of run and program mode, identification of the programmed controller as a master or slave programmed controller, and values indicative of the first and second condition which the programmed controller to trigger the change in state of the power driver switch.

13. A system for operating a self-contained power controller having an associated power driver switch, a communication port, an environmental parameter device, and a programmed controller comprising:
means for placing the programmed controller in run mode;
means for providing environmental parameter information from a control device;
means for evaluating the environmental parameter information to determine occurrence of a triggering event; and
means for changing the associated power driver switch state upon the occurrence of the triggering event;
wherein the environmental parameter information received by the programmed controller through the communication port is at least one of run and program mode, identification of the programmed controller as a master or slave programmed controller, and values indicative of a first condition and a second condition which the programmed controller should use to trigger the change in the associated power driver switch state.

14. A system according to claim 13, wherein the communication port is in coupled to the programmed controller and at least one of supervisory controller, computer, personal digital assistant, and a keypad.

15. A system according to claim 13, wherein an analog voltage device and a direct current voltage device are operatively coupled to a first voltage source at a first voltage value, the analog voltage device produces a second voltage value and the direct current voltage device produces a third voltage value;
means for providing a first voltage to the power driver switch;
means for providing a second and third voltage to the programmed controller; and
means for providing a second voltage to the environmental parameter device.

16. A machine-accessible medium having instructions capable of directing a machine to perform:
- placing a programmed controller in run mode;
- providing an environmental parameter information from a control device;
- receiving information by the programmed controller through a communication port, wherein the information is at least one of run and program mode, identification of the programmed controller as a master or slave programmed controller, and values indicative of a first condition and a second condition for changing power driver switch state;
- evaluating the environmental parameter information to determine the occurrence of a triggering event; and
- changing the state of the power driver switch upon the occurrence of the triggering event.

17. A machine-accessible medium having instructions capable of directing a machine according to claim 16, wherein a communication port is coupled to the programmed controller and at least one of a supervisory controller, a computer, a personal digital assistant, and a keypad.

18. A machine-accessible medium having instructions capable of directing a machine according to claim 16, wherein an analog voltage device and a direct current voltage device are both operatively coupled to a first voltage source at a first voltage value, the analog voltage device produces a second voltage value and the direct current voltage device produces a third voltage value,
- providing a first voltage to the power driver switch;
- providing a second and third voltage to the programmed controller; and
- providing a second voltage to the environmental parameter device.

19. An apparatus having a power driver switch, a communication port, an environmental parameter device, and a machine-accessible medium, the machine-accessible medium comprising:
- means for placing the apparatus in run mode;
- means for providing environmental parameter information from a control device;
- means for evaluating the environmental parameter information to determine the occurrence of a triggering event; and
- means for changing the power driver switch state upon the occurrence of a triggering event;
- wherein the environmental parameter information received by the programmed controller through the communication port is at least one of run and program mode, identification of the programmed controller as a master or slave programmed controller, and values indicative of a first condition and a second condition which the programmed controller should use to trigger the change in the power driver switch state.

20. An apparatus according to claim 19, wherein the apparatus is coupled to at least one of supervisory controller, computer, personal digital assistant, and a keypad.

21. An apparatus according to claim 19, wherein an analog voltage device and a direct current voltage device are operatively coupled to a first voltage source at a first voltage value, the analog voltage device produces a second voltage value and the direct current voltage device produces a third voltage value, and the machine-accessible medium further comprises:
- means for providing a first voltage to the power driver switch;
- means for providing a second and third voltage to the programmed controller; and
- means for providing a second voltage to the environmental parameter device.

22. A self-contained power controller comprising:
- a signal indicative of an environmental condition external to said self-contained power controller;
- a first voltage source external to said self-contained power controller;
- a second voltage source in said self-contained power controller, wherein the second voltage source is an analog voltage device;
- a third voltage source in said self-contained power controller, wherein the third voltage source is a direct current voltage device;
- a power driver switch in said self-contained power controller and coupled to the first voltage source;
- a programmable controller in said self-contained power controller coupled to said second voltage source, said third voltage source, said power driver switch, and said signal indicative of an environmental condition;
- means for evaluating the signal indicative of an environmental condition to determine a triggering event; and
- means for changing the power driver switch state upon the occurrence of a triggering event;
- wherein the programmable controller has a run mode which, when selected, upon the occurrence of the triggering event allows the power driver switch to change its state;
- wherein the power driver switch is maintained at the changed state until the occurrence of a second triggering event.

* * * * *